United States Patent
Tanaka et al.

(10) Patent No.: US 7,391,539 B2
(45) Date of Patent: Jun. 24, 2008

(54) IMAGE READER, IMAGE FORMING APPARATUS AND STORAGE MEDIUM STORING CONTROL PROGRAM OF THE IMAGE READER

(75) Inventors: Yoshihisa Tanaka, Higashiosaka (JP); Jiro Nagira, Higashiosaka (JP)

(73) Assignee: Kyocera Mita Corporation, Osaka (JP)

( * ) Notice: Subject to any disclaimer, the term of this patent is extended or adjusted under 35 U.S.C. 154(b) by 985 days.

(21) Appl. No.: 10/359,437

(22) Filed: Feb. 6, 2003

(65) Prior Publication Data

US 2004/0156082 A1    Aug. 12, 2004

(51) Int. Cl.
  *H04N 1/04* (2006.01)
  *H04N 1/00* (2006.01)
  *H04N 1/32* (2006.01)

(52) U.S. Cl. .................. 358/468; 358/442; 358/474; 358/497; 358/527; 358/400

(58) Field of Classification Search ......... 345/589–590, 345/104, 207; 358/1.9, 468, 448, 400, 474, 358/497, 442, 505, 500; 382/312, 318, 319
See application file for complete search history.

(56) References Cited

U.S. PATENT DOCUMENTS 5,657,708 A  *  8/1997  Okuno et al. ............ 112/102.5
5,963,337 A  * 10/1999  Inui et al. ................. 358/296
2003/0053099 A1 * 3/2003  Sakaguchi ................. 358/1.9

FOREIGN PATENT DOCUMENTS

JP       07236016 A   *  9/1995
JP     2004140763 A   *  5/2004

* cited by examiner

*Primary Examiner*—Cheukfan Lee
(74) *Attorney, Agent, or Firm*—Jordan and Hamburg LLP

(57) ABSTRACT

An image reader is provided with a display changing signal input means for inputting a signal to change the display of the display panel, wherein the control unit is provided with a function of, when a display changing signal is inputted from the display changing signal input means and an image data of the operation keys described by closed areas in the layout of the operation keys written on the document is read by the image reading means, analyzing the image data and determining display operation keys to be displayed on the display panel in correspondence with the operation keys, a function of displaying the display operation keys on the display panel, a function of displaying a function selection screen used to allot functions to the display operation keys after the display operation keys are displayed on the display panel, and a function of allotting the functions selected from a function list on the function selection screen to the display operation keys.

18 Claims, 13 Drawing Sheets

FIG. 5A
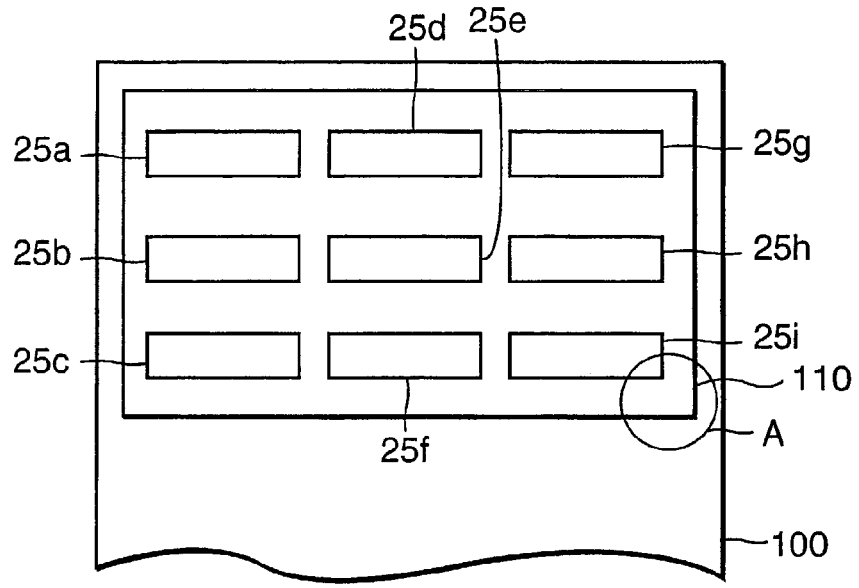
FIG. 5B
| | | | | 3.7 | 2.7 | 1.7 |
|---|---|---|---|---|---|---|
| | | 250i1 | | 3.6 | 2.6 | 1.6 |
| | | | | 3.5 | 2.5 | 1.5 |
| 7.4 | 6.4 | 5.4 | 4.4 | 3.4 | 2.4 | 1.4 |
| 7.3 | 6.3 | 5.3 | 4.3 | 3.3 | 2.3 | 1.3 |
| 7.2 | 6.2 | 5.2 | 4.2 | 3.2 | 2.2 | 1.2 |
| 7.1 | 6.1 | 5.1 | 4.1 | 3.1 | 2.1 | 1.1 |
FIG. 5C
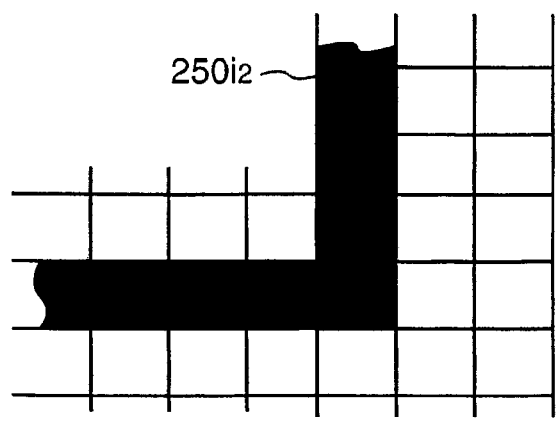

IMAGE READER, IMAGE FORMING APPARATUS AND STORAGE MEDIUM STORING CONTROL PROGRAM OF THE IMAGE READER

BACKGROUND OF THE INVENTION AND RELATED ART STATEMENT

1. Field of the Invention

The present invention relates to an image reader for reading an image information, a copier, a printer, a facsimile or like image forming apparatus provided with the image reader, and a storage medium storing a control program of the image reader.

2. Description of the Related Art

Generally, image forming apparatuses such as copiers are provided with an operation unit including various operation keys such as functions keys, a tenkey, a start button and a cancel key and a display screen for displaying various messages in order to enable a user to input various data. Functions are allotted to various touch-operable operation keys displayed on this display screen at the time of shipment from a factory.

Some of the operation keys on the display screen are designed to enable a user to allot optional functions and the like prepared in advance. Desired functions are suitably allotted to these operation keys by the user operating the operation keys of the operation unit designed to allot the functions.

However, the conventional image forming apparatuses are not designed to enable the user to change the shapes, sizes and positions of various operation keys on the display screen as he will and, accordingly, have not been necessarily convenient to all the users. Further, recent image forming apparatuses provided with a multitude of functions are more strongly required to have an operation unit constructed to conform to used modes of users.

Accordingly, an object of the present invention is to provide an image reader and an image forming apparatus provided with such an image reader in which the arrangement of operation keys on a display screen (display panel) of an operation unit and the construction of the display screen can approximate to those desired by users themselves. Another object of the present invention is to provide a control program of the image reader which program enables the construction of the display screen to approximate to the one desired by users themselves.

SUMMARY OF THE INVENTION

In order to accomplish the above object, the present invention is directed to an image reader, comprising:

(a) an image reading means for reading an image information of a document, (b) an operation unit provided with a display panel adapted to display the operation keys and information and touch-operable by a user, (c) a control unit for controlling the operations of the image reading means and the operation unit, and (d) a display changing signal input means for inputting a signal to change the display of the display panel, wherein the control unit is provided with:

a function of, when a display changing signal is inputted from the display changing signal input means and an image data of the operation keys described by closed areas in a layout written on the document is read by the image reading means, analyzing the image data and determining display operation keys to be displayed on the display panel in correspondence with the operation keys, a function of displaying the display operation keys on the display panel, a function of displaying a function selection screen used to allot functions to the display operation keys after the display operation keys are displayed on the display panel, and a function of allotting the functions selected from a function list on the function selection screen to the display operation keys.

With the above construction, the existing display state of the display panel (display panel at the time of shipment from a factory) can be changed to the one desired by the user by causing the image reading means to read the document written with the layout of the operation keys designed by the user himself and allotting the desired functions to the respective operation keys in the layout. Thus, an image forming apparatus and an image reader provided with a display panel easily usable by users can be provided.

These and other objects, features and advantages of the present invention will become more apparent upon reading the following detailed description along with the accompanying drawings.

BRIEF DESCRIPTION OF THE DRAWINGS

FIG. 5A is a diagram showing a document written with an arrangement of operation keys, FIG. 5B is a diagram showing a state where a document showing an arrangement of operation keys is read and raster vector conversion is applied to a read image data, FIG. 5C is a diagram showing a state where line segments obtained by raster vector conversion in FIG. 5B are replaced by touch-detecting measures on a display panel.

DETAILED DESCRIPTION OF THE PREFERRED EMBODIMENTS OF THE INVENTION

The present invention is now described, by way of example, with reference to the accompanying drawings.

First Embodiment (Construction of Image Forming Apparatus)

Figure 1A:
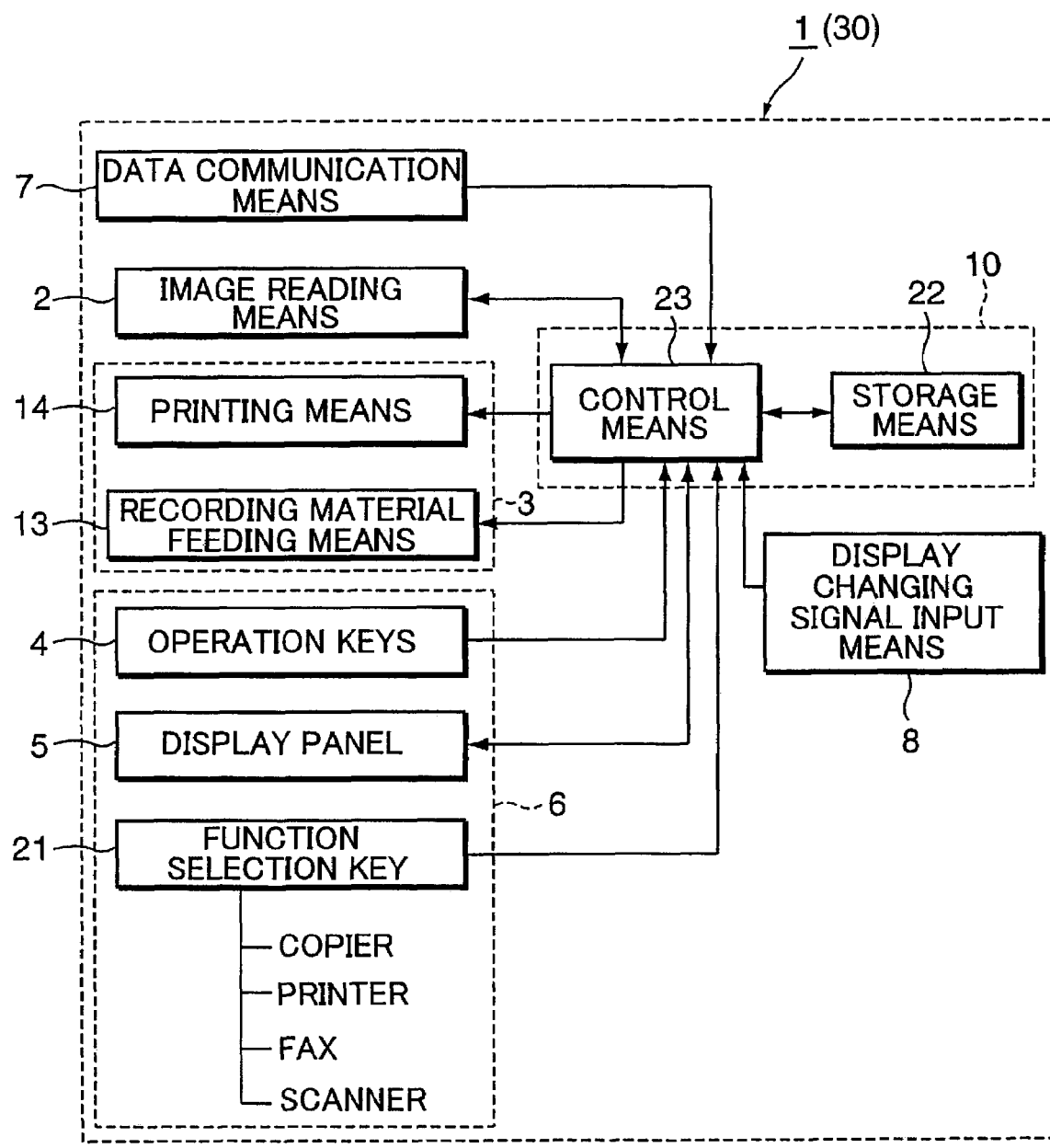
FIG. 1A is a control block diagram of an image forming apparatus according to a first embodiment of the invention.
Figure 1B:
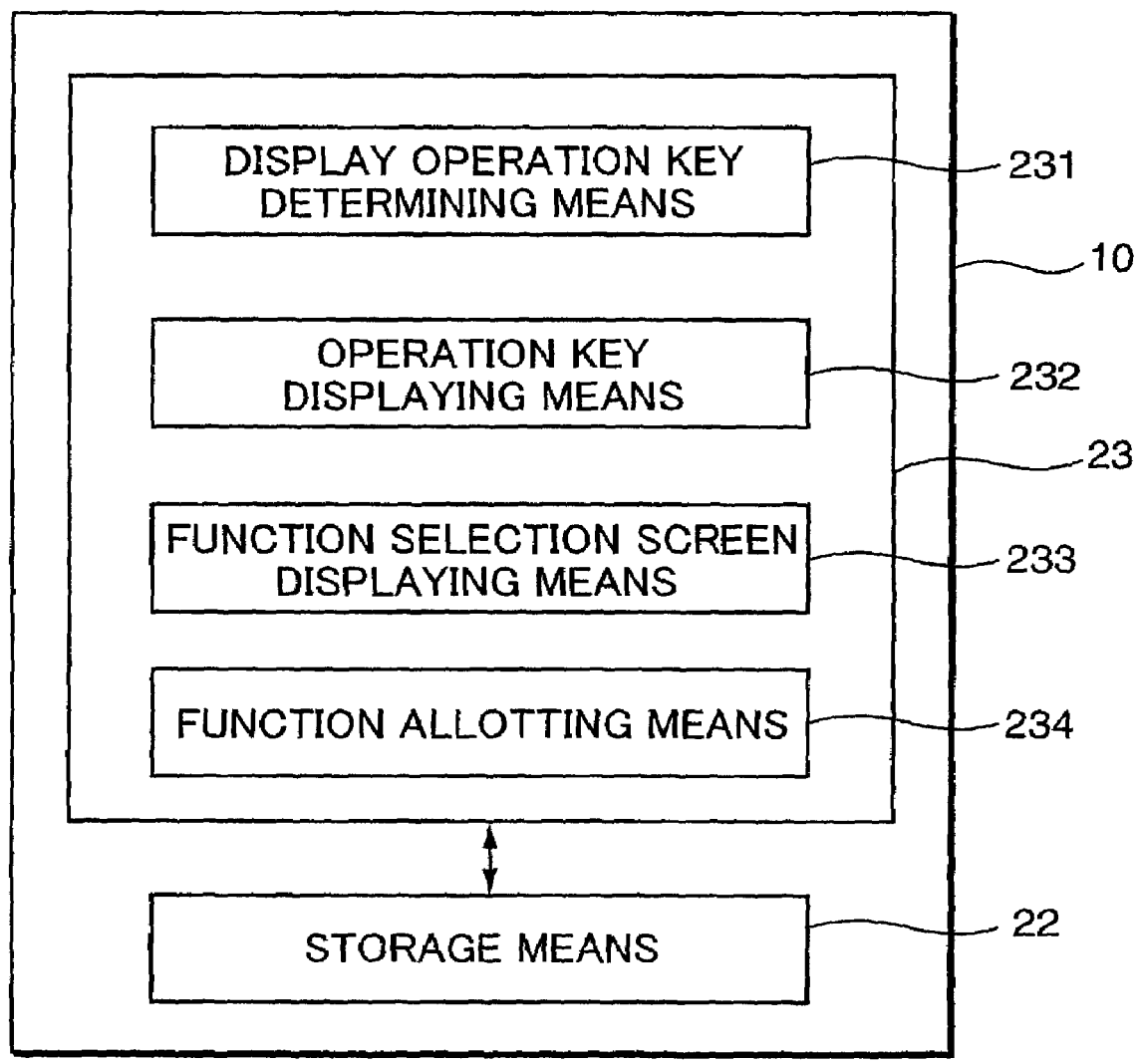
FIG. 1B is a construction diagram of a control unit according to the first embodiment of the invention.
Figure 2:
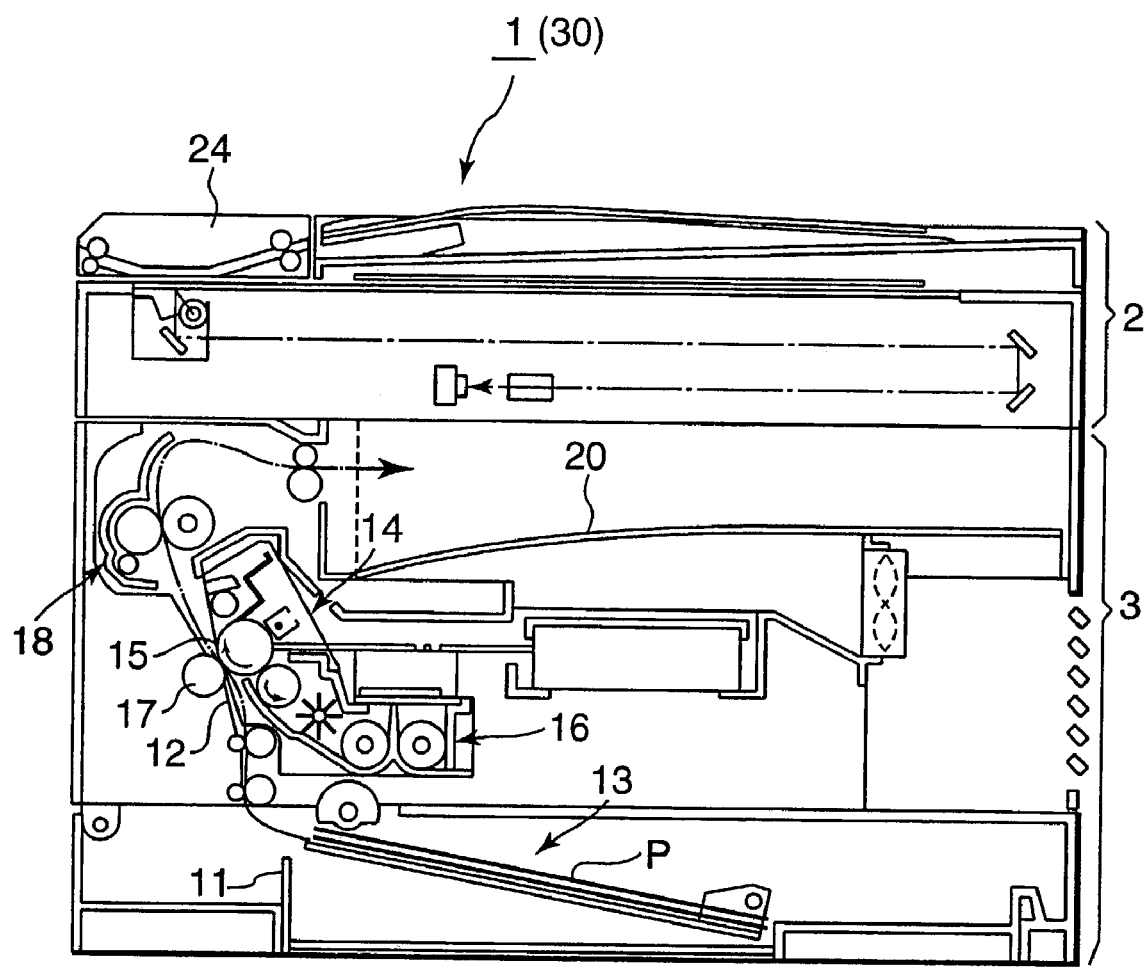
FIG. 2 is a schematic construction diagram of the image forming apparatus according to the first embodiment of the invention.

FIG. 1A is a control block diagram of an image forming apparatus according to a first embodiment of the invention, FIG. 1B is a construction diagram of a control unit according to the first embodiment of the invention, and FIG. 2 is a schematic construction diagram of the image forming apparatus according to the first embodiment of the invention.

As shown in these FIGURES, an image forming apparatus 1 is provided with an image reading means 2 as a scanner for reading an image of a document, a printer unit 3, an operation unit 6, a data communication means 7, a display changing signal input means 8, and a control unit 10. The printer unit 3 forms an image on a recording material P such as a copy sheet based on an image information read by the image reading means 2. The operation unit 6 includes various operation keys 4 used to input data to operate the image reading means 2 and the printer unit 3, a display panel (touch panel) 5 for displaying messages and the like. The data communication means 7 enables data transmission to and data reception from an external terminal device. The display changing signal input means 8 inputs a signal to change the display state of the display panel 5 from the one set at the time of shipment from a factory to another. The control unit 10 controls the operations of the image reading means 2, the printer unit 3 and the like based on data inputted by means of the operation unit 6.

In the following description, an expression "operation unit layout" has the same meaning as a layout (arrangement) of the operation keys displayed on the display panel 5 if no special annotation is given. Specifically, in this specification, the expression "operation unit layout" is used to mean the arrangement of the touch-operable operation keys excluding hard keys (start key) of the operation unit 6 of the image forming apparatus 1, displayed on the display panel 5.

The image reading means 2 conducts a photoelectric conversion while scanning an image of a document by means of an image sensor including CCDs to thereby convert the read image information into an electrical signal, and improves the quality of the read image by means of various kinds of image processing devices.

The printer unit 3 is provided with a recording material feeding means 13 for feeding a recording material P such as a copy sheet from a sheet feeding tray 11 along a recording material feeding path 12, and a printing means 14 for forming an image on the recording material P fed from the recording material feeding means 13. The printing means 14 converts an electrical signal into an optical signal using a semiconductor laser or the like, focuses this optical signal on a photosensitive element 15 via a focusing device to form an electrostatic latent image on the photosensitive element 15, and then feeds toner onto the photosensitive element 15 by means of a developing device 16 to develop the electrostatic latent image on the photosensitive element 15 into a toner image. Further, after transferring the toner image on the photosensitive element 15 onto the recording material P such as a copy sheet by means of a transferring device 17, the printing means 14 causes a fixing device 18 to heat and press the toner image on the recording material P to fix the toner image to the recording material P and then discharges the recording material P bearing the fixed image onto a discharge tray 20 or the like.

The operation unit 6 is provided with the operation keys 4 including a copy start button and various function setting keys, a function selecting key 21 used to select various functions (copier function, printer function, facsimile function and scanner function) of the image forming apparatus 1, and the display panel (panel touch-operable by user) 5 such as a liquid crystal display panel adapted to display various messages and having a touch panel function.

The data communication means 7 enables data transmission to and data reception from an external terminal device (e.g. mobile phone, PHS, personal computer, copier, facsimile device, network scanner, etc.). Specifically, the data communication means 7 transmits an image data read by the image reading means 2 via facsimile and enables data transmission to and data reception from another computer or the like connected via a network. This data communication means 7 also has a function of enabling a radio communication of various data stored in a storage means 22 of the image forming apparatus 1 with a mobile phone or PHS.

The display changing signal input means 8 is a display changing switch or a display changing key used to input a signal for changing the display state of the display panel 5 from the one set at the time of shipment from a factory to another, and is provided in the operation unit 6 or at a position adjacent to the operation unit 6.

The control unit 10 is provided with a CPU 23 as a control means and a storage means 22 for storing various control programs and data. The control unit 10 outputs control signals to the image reading means 2, the printing means 14, the recording material feeding means 13 and the like in accordance with the control programs stored in the storage means and signals from the input keys, thereby controlling the operations of these means. More specifically, the control unit 10 is provided with a display operation key determining means 231, an operation key displaying means 232, a function selection screen displaying means 233 and a function allotting means 234 as shown in FIG. 1B. When the display changing signal is inputted from the display changing signal input means and an image data of the operation keys described by closed areas in the operation unit layout (layout of the operation keys) written on the document is read by the image reading means, the display operation key determining means 231 analyzes the image data and determines display operation keys to be displayed on the display panel which keys correspond to the operation keys. The operation key displaying means 232 causes the display operation keys to be displayed on the display panel. After the display operation keys are displayed on the display panel, the function selection screen displaying means 233 displays a function display screen for allotting functions to the display operation keys. The function allotting means 234 allots the functions selected from a function list on the function selection screen to the corresponding display operation keys.

Figure 1C:
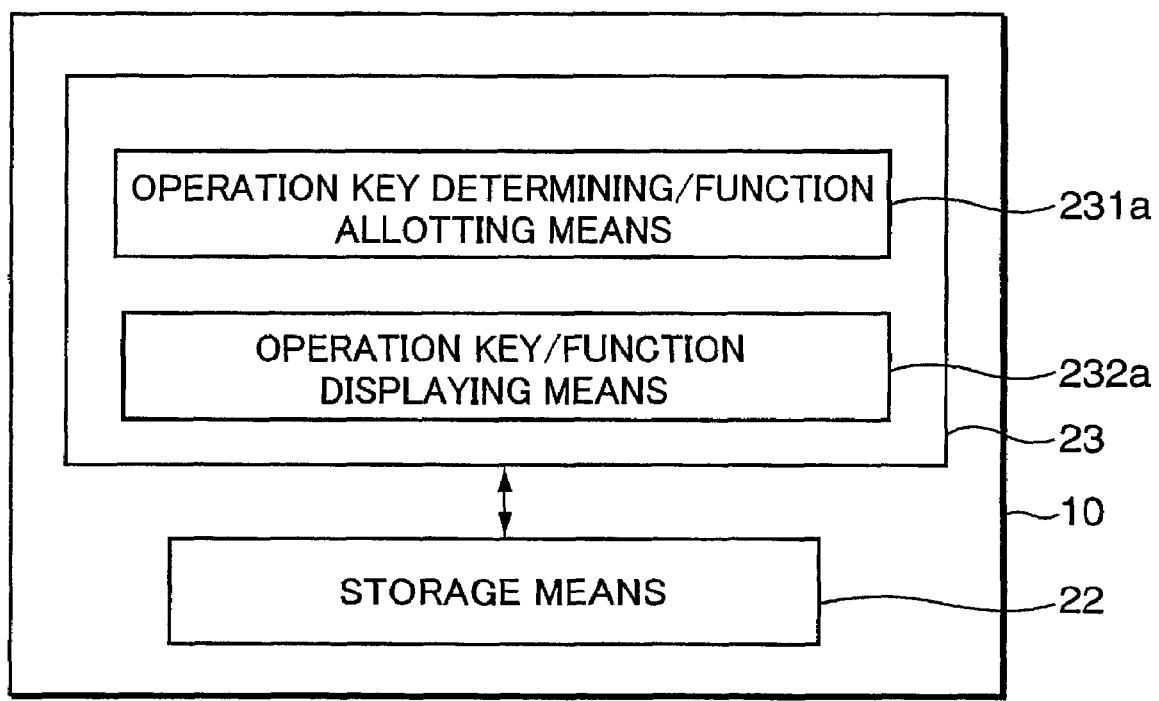
FIG. 1C is a construction diagram of a control unit according to a second embodiment of the invention.

A control unit 10 according to a second embodiment to be described later is provided with an operation key determining/function allotting means 231a and an operation key/function displaying means 232b as shown in FIG. 1C. When the display changing signal is inputted from the display changing signal input means and an image data of the operation keys described by the closed areas in the operation unit layout (layout of the operation keys) written on the document and function data corresponding to these operation keys are read by the image reading means, the operation key determining/function allotting means 231a analyzes the image data, determines the display operation keys to be displayed on the display panel, which keys correspond to the operation keys and, and allots the functions to the corresponding display operation keys. The operation key/function displaying means 232b causes the display operation keys to be displayed on the display panel.

(Operation of the Image Forming Apparatus)

The image forming apparatus 1 thus constructed is characterized in that the construction of the display panel 5 of the operation unit 6 (arrangement of the operation keys displayed on the display panel 5) set beforehand at the time of shipment from the factory can be changed to the display state corresponding to the layout of the operation keys on the document read by the image reading means 2.

Specifically, according to the image forming apparatus 1 of this embodiment, a desired layout of the operation unit is written on the document by the user, and the layout of the operation keys written on the document is read by the image reading means 2 in order to make the operation unit 6 more conveniently usable by the user. Thus, the existing layout display state on the display panel 5 can be replaced by the layout display state on the display panel 5 corresponding to read the layout.

Figure 3:
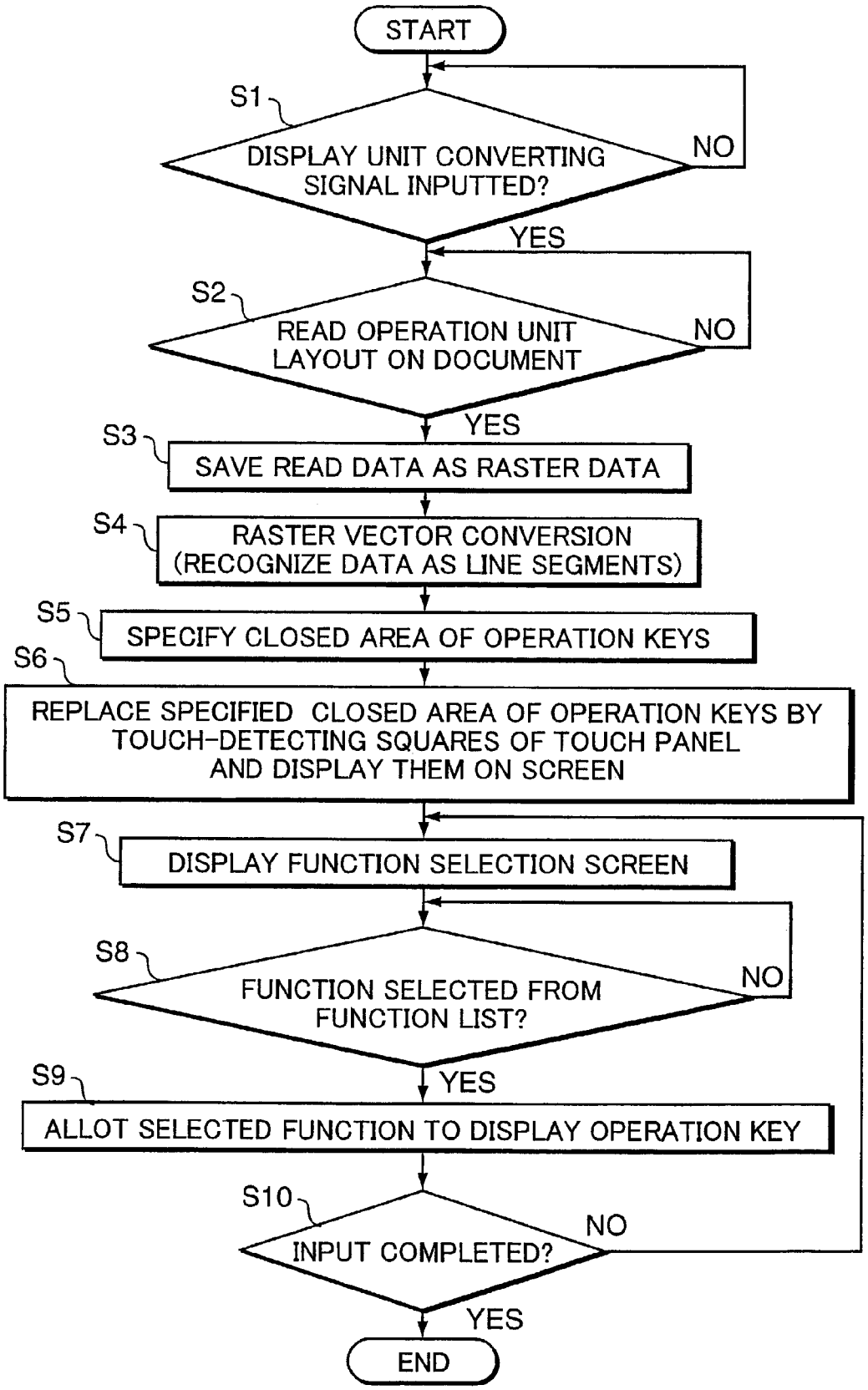
FIG. 3 is a flow chart showing the operation of the image forming apparatus according to the first embodiment.

FIG. 3 is a flow chart showing a display changing operation of the operation unit 6 (display panel 5). FIGS. 5A to 5D are diagrams showing a procedure of reading a document 100 written with an operation unit layout 110 desired by an operator and displaying the operation unit layout 110 on the display panel 5. The display state on the display panel 5 is used in place of the existing display state and includes a plurality of display operation keys (closed areas) 25ap, 25bp, 25cp, . . . , 25ip.

In such a state where a main switch of the image forming apparatus 1 is on and the image reading means 2 can read an image of the document 100, a display changing signal is inputted from the display changing signal input means 8 (Step S1), the document 100 is fed to the image reading means 2 by an automatic document feeder 24 or the like, and an arrangement data 110 (image data) of the operation keys 25a, 25b, . . . , 25i of the operation unit layout written on the document 100 is read by the image reading means 2 (Step S2). The read image data is temporarily saved as a raster data in the storage means 22 (Step S3). Raster vector conversion is applied to the saved image data to recognize an image written in a readable area as line segments 250i1 (see FIG. 5B) (Step S4). FIG. 5B is an enlarged diagram of an image data corresponding to a right-lower end portion A of the operation key 25i shown in FIG. 5A, showing a state where the image data is recognized as line segments after raster vector conversion is applied thereto. A position (pixel position) where a closed area of a rectangular, triangular, circular or other shape is formed is specified based on the recognized line segments 250i1 (see FIG. 5B) (Step S5). The specified closed areas are displayed as display areas (25ap, 25bp, . . . , 25ip) of the respective operation keys while being replaced by touch-detecting measures on the display panel (Step S6). In other words, since the line segments 250i1 shown in FIG. 5B cross touch-detecting measures (3, 3), (3, 4), (3, 5), (3, 7), . . . , (4, 3), (5, 3), (6, 3), (7, 3), . . . on the display panel 5, the measures (3, 3), (3, 4), (3, 5), (3, 7), . . . , (4, 3), (5, 3), (6, 3), (7, 3), . . . crossing the line segments are judged to be measures 250i2 corresponding to the recognized line segments and displayed as in FIG. 5C.

Figure 5D:
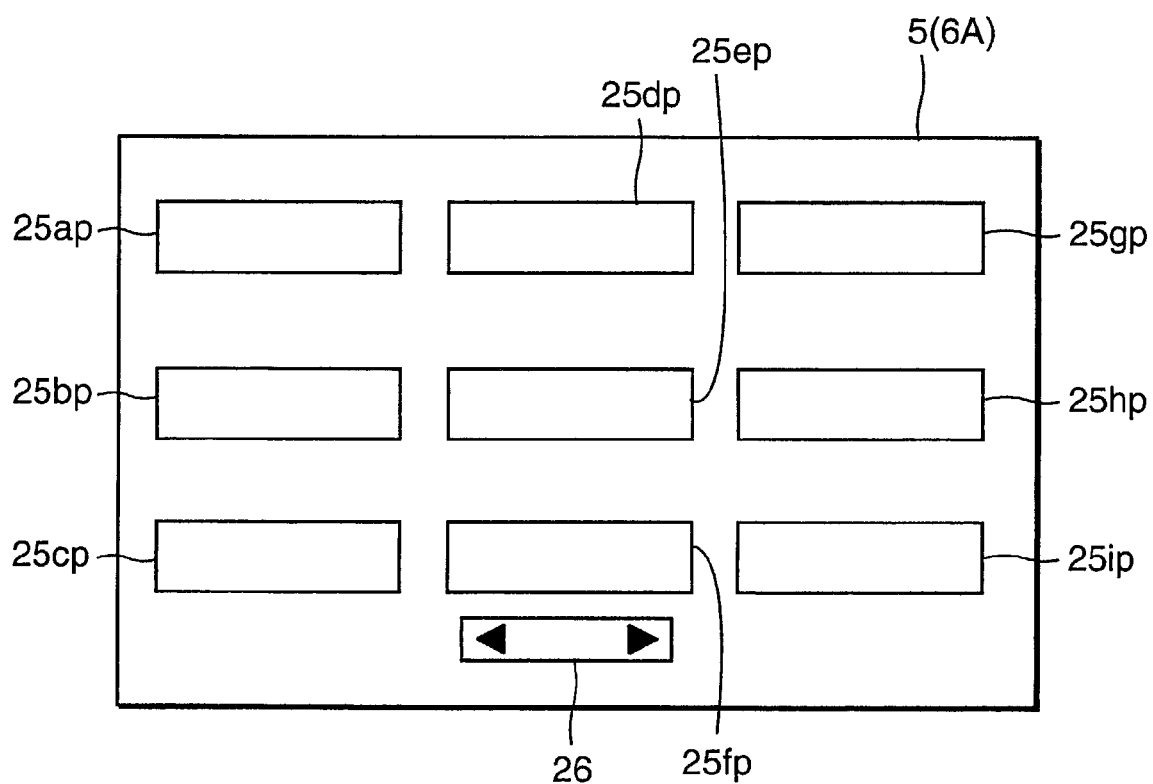
FIG. 5D is a diagram showing an arrangement of the operation keys displayed on the display panel.

Next, in the case that a plurality of display operation keys 25ap, . . . , 25ip are displayed on the display panel 5 as shown in FIG. 5D, it is necessary to specify the display operation keys one by one and to allot a function to each of them. Thus, a designation key 26 is displayed to designate the display operation keys 25ap, . . . , 25ip. A function selection screen 27 (see FIG. 6) is so displayed on the display panel 5 as to correspond to the display operation keys 25ap, . . . , 25ip designated by the designation key 26 (Step S7).

Figure 6:
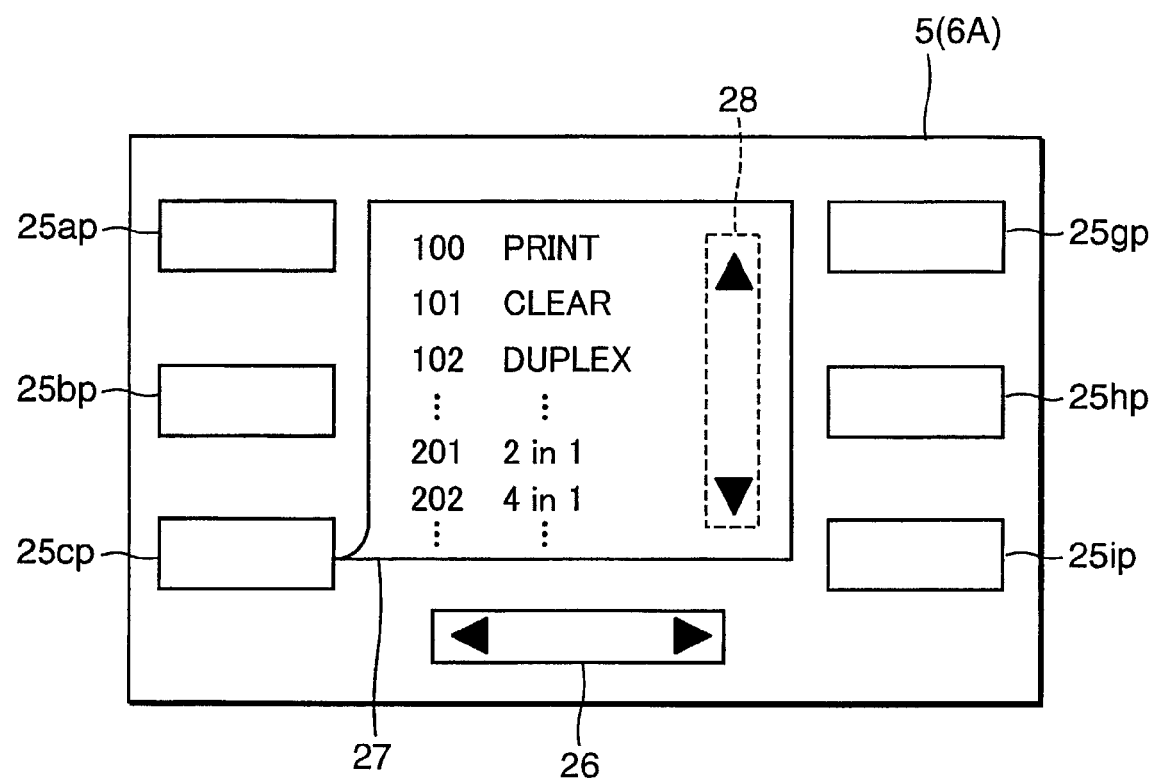
FIG. 6 is a diagram showing a state where functions are allotted to the operation keys displayed on the display panel.

FIG. 6 shows an example of the function selection screen 27 to be displayed on the display panel 5. On the function selection screen 27 shown in FIG. 6 are displayed a list of functions to be allotted to the respective display operation keys 25ap, . . . , 25ip and a scroll key 28 for selecting and determining the respective functions. The functions to be allotted are searched from the list to select a desired function by this scroll key 28 (Step S8). The selected functions are allotted to the corresponding display operation keys 25ap, . . . , 25ip and the display operation keys 25ap, . . . , 25ip having the functions allotted thereto are newly set as operation keys (Step S9). After the functions are allotted to all the display operation keys 25ap, . . . , 25ip, a series of operations to change the operation unit 6 are completed (Step S10).

In this embodiment, among the display operation keys 25 displayed on the display panel 5, those having the functions allotted thereto (having functions already selected therefor) and those having no function allotted thereto (having no function selected therefor yet) may be distinguishably displayed. For example, the display operation keys having the function already selected therefor and those having no function selected therefor yet may be distinguished by displaying them in black-and-white inverted manner or by blinking only the display operation keys having no function selected therefor yet or by changing the display colors of these two different kinds of display operation keys.

In this embodiment, the already allotted functions in the function list of the function selection screen 27 may be deleted or marked to make them unusable. Such an arrangement makes a function allotting operation more efficient.

Figure 7:
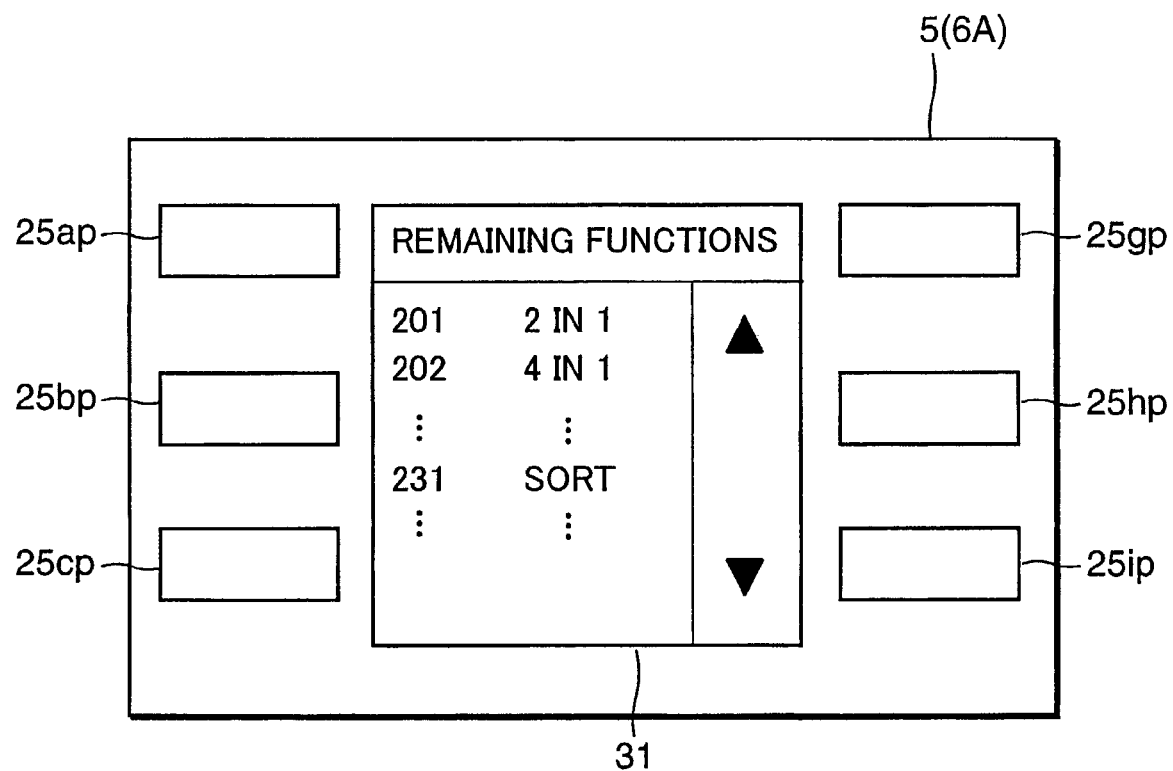
FIG. 7 is a diagram showing remaining unallotted functions when the functions are allotted to the operation keys displayed on the display panel.

In this embodiment, if there is any function allotted to none of the respective display operation keys 25ap, . . . , 25ip, the unallotted functions of a function list 31 may be displayed on the display panel 5 and the functions to be allotted may be so selected from the function list 31 as to correspond to the display operation keys 25ap, . . . , 25ip (see FIG. 7). Converse to the above, the same function may be allotted to a plurality of operation keys.

Effects of the First Embodiment

As described above, according to the first embodiment, the document 100 written with the operation key layout designed by the user himself is read by the image reading means 2, and the desired functions are allotted to the respective operation keys in the read layout by the image reading means 2. Thus, the existing operation unit 6 display state of the display panel 5 at the time of shipment from the factory) can be changed to the one desired by the user and the image forming apparatus 1 conveniently usable by the user can be provided. Further according to this embodiment, an image reader 30 such as a network scanner constructed by omitting the printing unit 3 from the image forming apparatus 1 can be made easily usable by the user.

Second Embodiment

Figure 4:
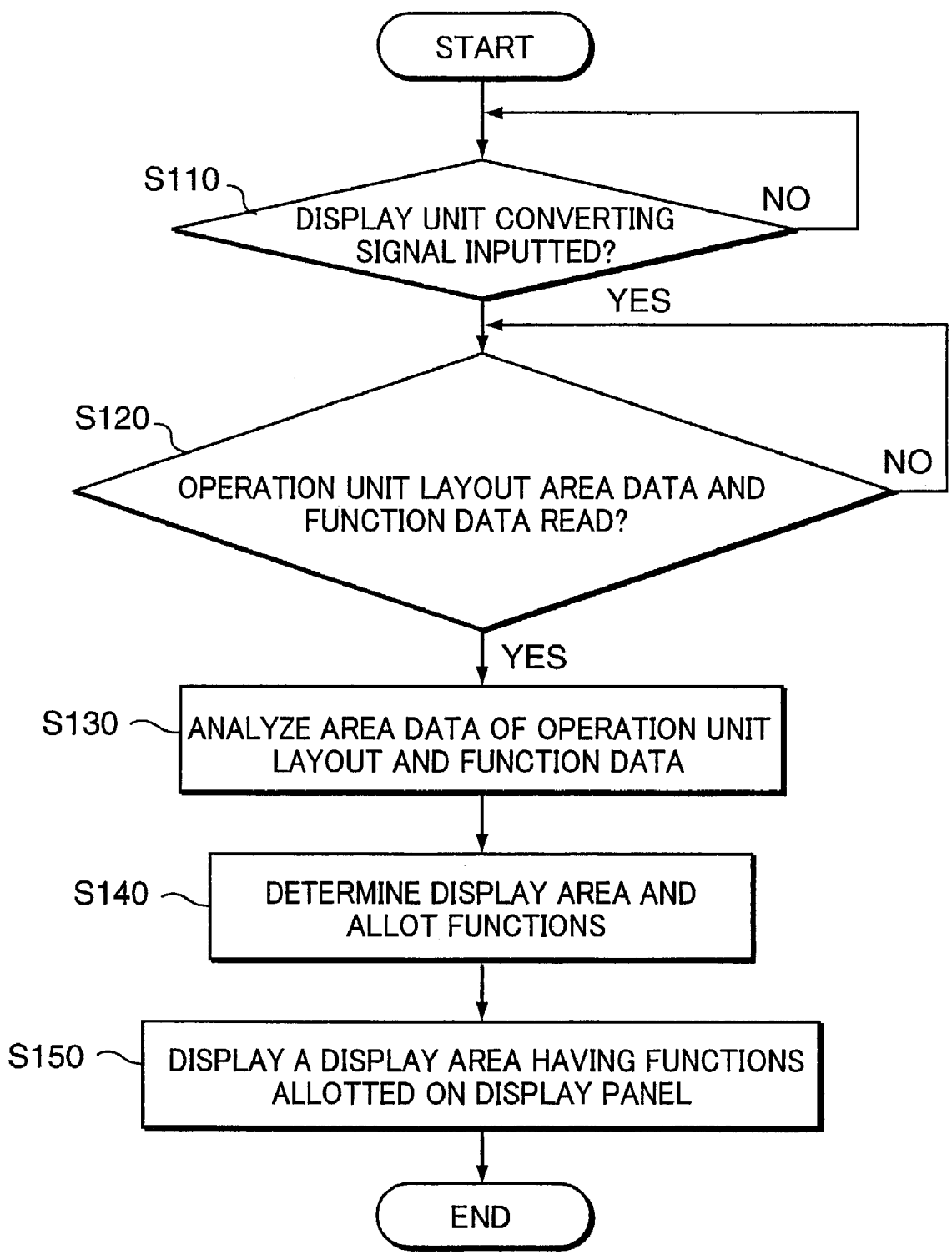
FIG. 4 is a flow chart showing the operation of the image forming apparatus according to the second embodiment.

FIG. 4 is a flow chart showing the operation of an image forming apparatus 1 according to the second embodiment of the present invention. The image forming apparatus 1 of this embodiment can change an existing operation unit 6 (operation unit at the time of shipment from a factory) to an operation unit 6A (see FIG. 8B) written on a document read by an image reading means 2 by reading an operation unit layout 210 written on a document 200 shown in FIG. 8A and a function data (DUPLEX; 1 IN 1; ENLARGE; 4 IN 1; REDUCE) used to determine which functions are allotted to operation keys 35a, 35b, 35c, . . . , 35f in the operation unit layout 210 by means of the image reading means 2.

Figure 8A:
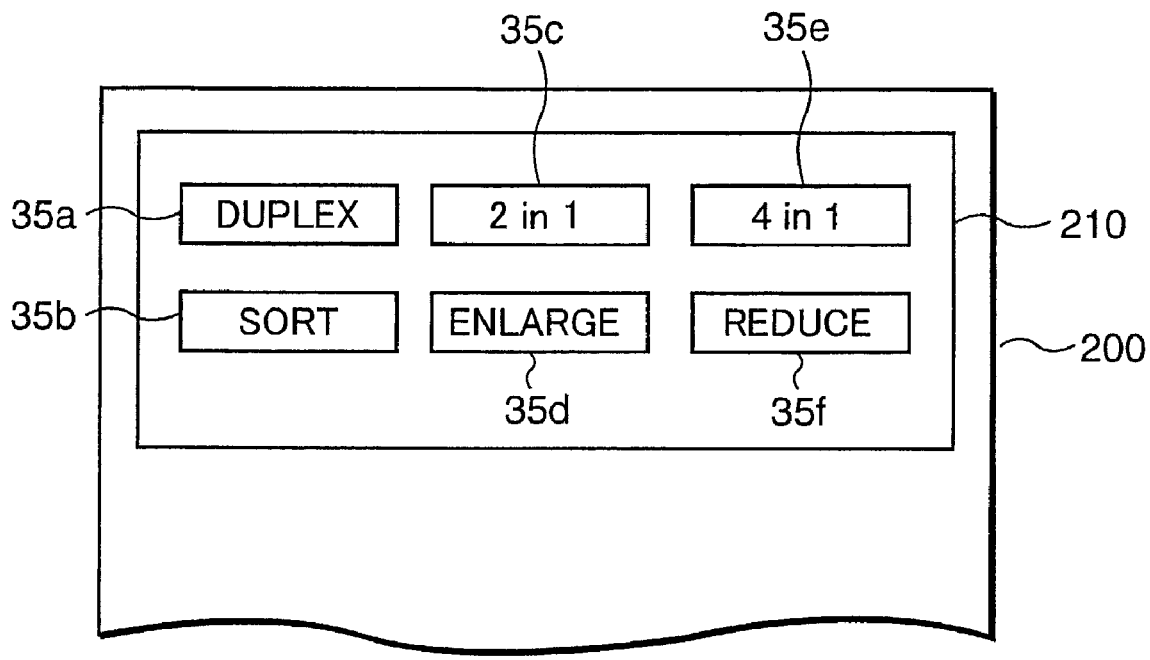
FIG. 8A is a diagram showing a document written with an arrangement of operation keys and functions desired to be allotted to the respective operation keys.
Figure 8B:
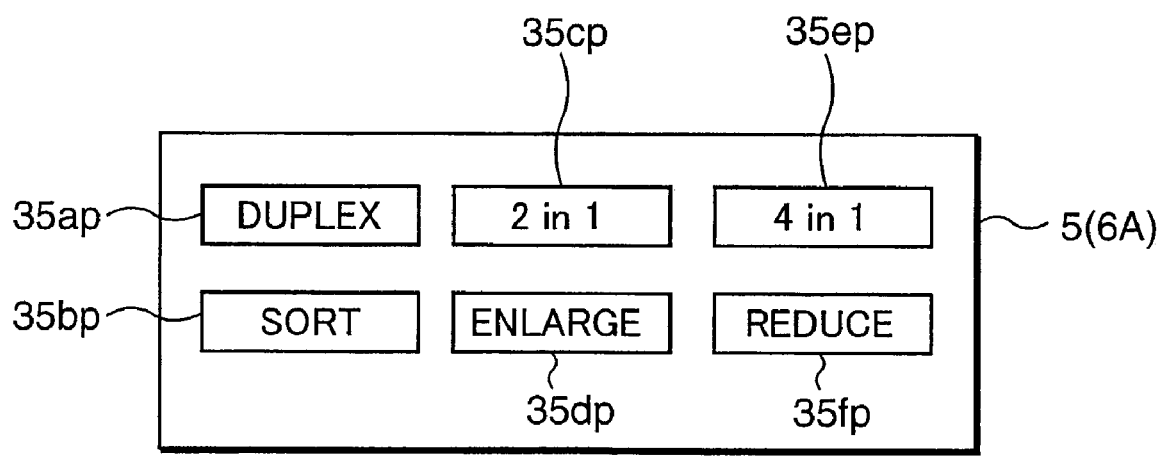
FIG. 8B is a diagram showing a state where the document of FIG. 8A is read and a read information is reflected on the display panel.

Here, the function data corresponding to the operation keys shown in FIG. 8A are numbers, symbols, characters, barcodes, and like analyzable data written on the document 200 in relation to data of the operation keys 35a, 35b, . . . , 35f. In this embodiment, since desired functions are allotted to the respective display operation keys 35ap, 35bp, 35cp, . . . , 35fp of the new operation unit 6A only by reading the image data of the document 200 by means of the image reading means 2, an operation performed by a user to allot the functions can be made easier than in the first embodiment. Hereinafter, an operation of changing the operation unit 6 of the image forming apparatus 1 according to the second embodiment is described.

In such a state where a main switch of the image forming apparatus 1 is on and the image reading means 2 can read the image of the document 200, a display changing signal is inputted from a display changing signal input means 8 (Step S110), the document 200 is fed to the image reading means 2 by an automatic document feeder 24 or the like, and the image data (35a, 35b, . . . , 35f) of the operation unit layout 210 and the function data (DUPLEX; . . . , REDUCE) written on the document 200 are read by the image reading means 2(Step S120). As a matter of course, a control unit 10 is provided with a character recognizing means and can recognize usual characters written in the square style or by hand. An arrangement data of the operation keys 35a, 35b, . . . , 35f of the operation unit layout 210 and the function data (DUPLEX; . . . , REDUCE) are analyzed (Step S130).

Subsequently, the display operation keys 35ap, 35bp, . . . , 35fp corresponding to the operation keys 35a, 35b, . . . , 35f of the operation unit layout 210 on the document 200 are determined and the corresponding functions (DUPLEX; . . . , REDUCE) are allotted to the display operation keys 35ap, 35bp, . . . , 35fp (Step S140). Then, the display operation keys 35ap, 35bp, . . . , 35fp having the functions allotted thereto are displayed on the display panel 5 (Step S150). In this way, a series of operations to change the operation unit 6 are completed. It should be noted that a correction key may be provided in the operation panel 5 so that a combination of the functions corresponding to the display operation keys 35ap, 35bp, . . . , 35fp can be suitably changed.

As described above, according to the second embodiment, the operation unit 6 can be easily changed to the operation unit 6A desired by the user as in the first embodiment. Further, according to the second embodiment, an operation performed by the user to allot the functions can be made easier since the functions are allotted to the respective display operation keys 35ap, 35bp, . . . , 35fp only by reading the document 200 written with the arrangement data of the operation keys of the operation unit layout 210 and the function data corresponding to these operation keys by means of the image reading means 2.

OTHER EMBODIMENTS

Although the respective display operation keys 35ap, 35fp and the respective functions are displayed in correspondence on the display panel 5 after the functions are allotted to the display operation keys 35ap, . . . , 35fp in the foregoing embodiments, the allotted functions may be displayed in the form of corresponding icons.

Figure 9A:
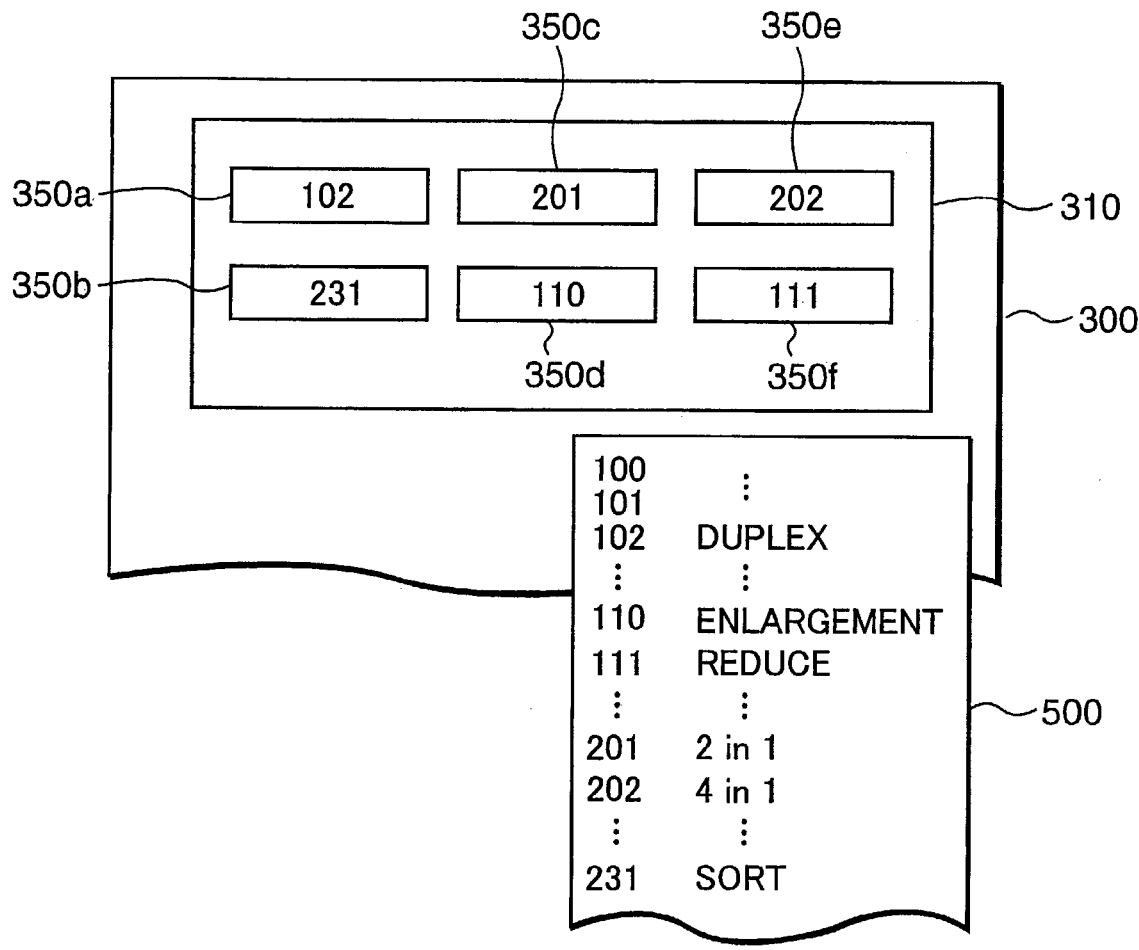
FIG. 9A is a diagram showing a document written with an arrangement of operation keys and numbers corresponding to functions desired to be allotted to the respective operation keys.
Figure 9B:
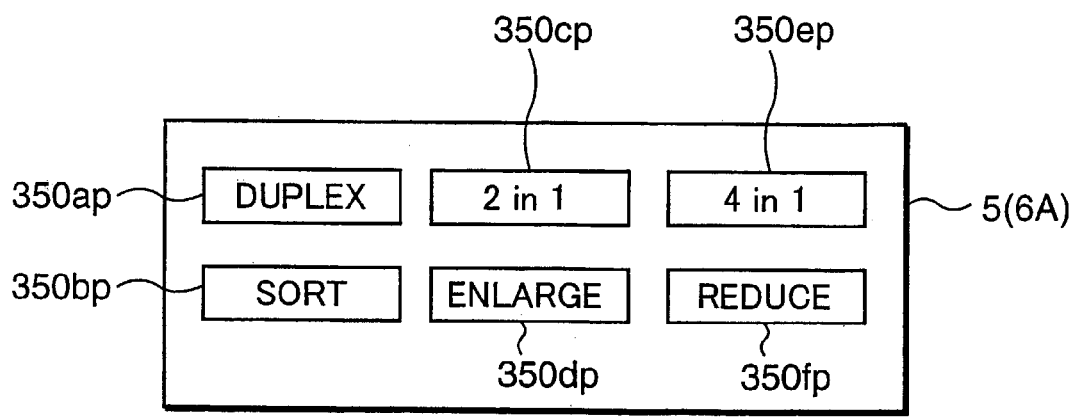
FIG. 9B is a diagram showing a state where the document of FIG. 9A is read and a read information is reflected on the display panel.

Further, as shown in FIG. 9A, a layout 310 of operation keys (operation unit layout) may be written on a document 300 and numbers corresponding to functions enumerated in a function list 500 set beforehand may be written within the frames of the operation keys. In FIG. 9A, number 102 is written within the frame of an operation key 350a to allot a duplex copying function (DUPLEX) to the operation key 350a; number 231 is written within the frame of an operation key 350b to allot a sorting function (SORT) to the operation key 350b; number 201 is written within the frame of an operation key 305c to allot a 2-in-1 function (2 IN 1) to the operation key 350c; number 110 is written within the frame of an operation key 350d to allot an enlarging function (ENLARGEMENT) to the operation key 350d; number 202 is written within the frame of an operation key 350e to allot a 4-in-1 function (4 IN 1) to the operation key 350e; and number 111 is written within the frame of an operation key 350f to allot a reducing function (REDUCE) to the operation key 350f. FIG. 9B shows operation keys 350ap, 350bp, 350cp, 350dp, 350ep, 350fp and the corresponding functions (DUPLEX, SORT, 2 IN 1, ENLARGEMENT, 4 IN 1, REDUCE) to be displayed on the display panel 5 after the document 300 is read.

Figure 10A:
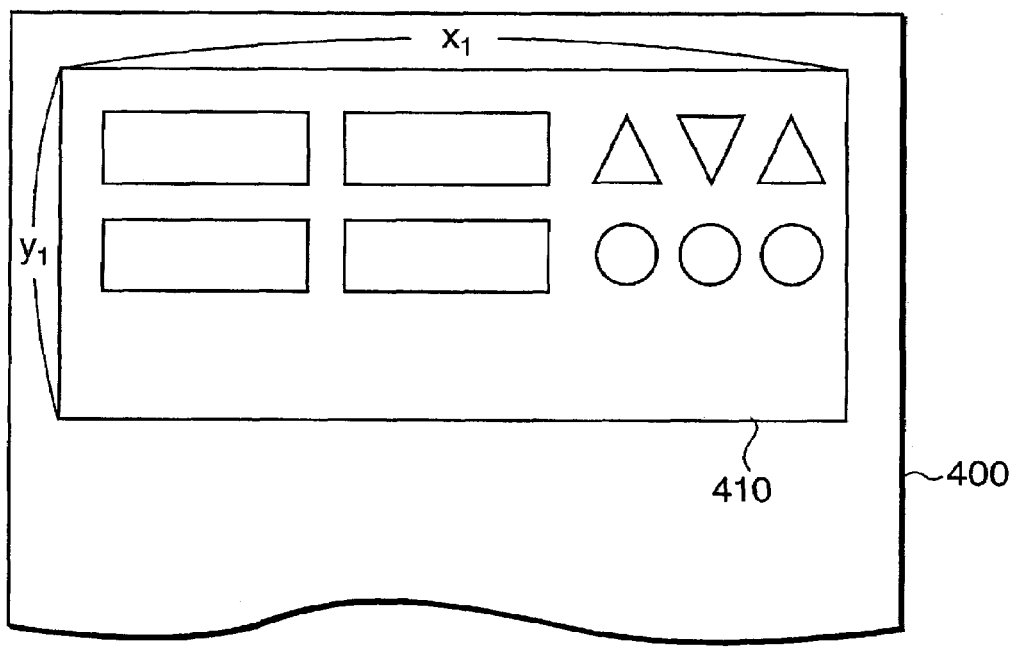
FIGS. 10A and 10B are diagrams showing a dimensional relationship between a readable area of a document and a display area of the display panel.
Figure 10B:
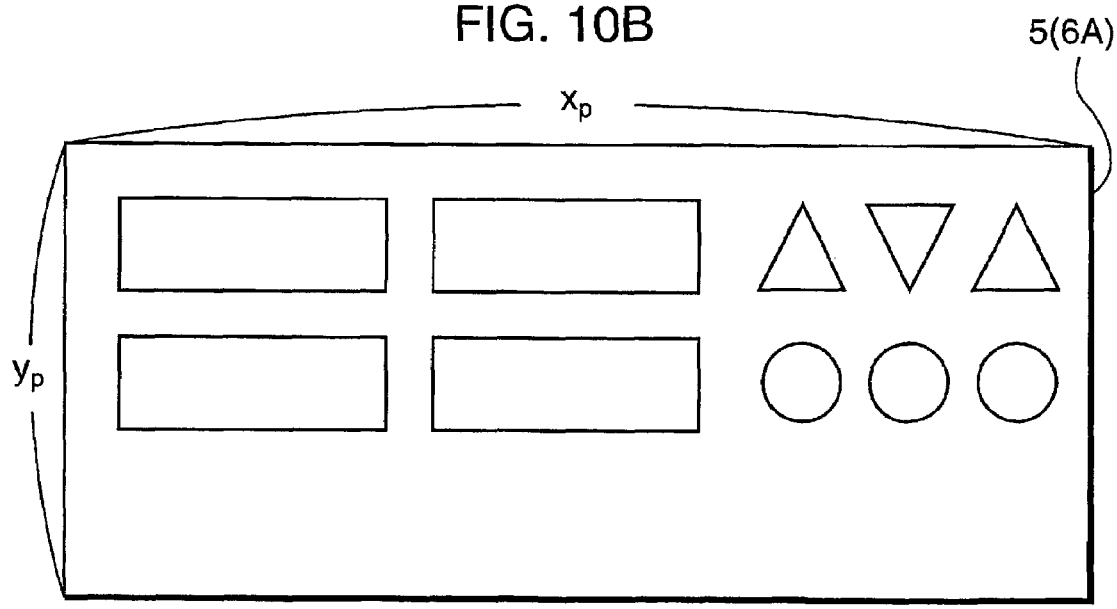

As shown in FIG. 10A, it is desirable to set dimensions of a readable range (vertical dimension: Y1, horizontal dimension: X1) at the same as those (vertical dimension: Yp, horizontal dimension: Xp) of the display screen of the display panel 5 shown in FIG. 10B in the case of setting a readable range 410 on a document 400 written with a layout of operation keys desired by an operator. Here, it is desirable to set the readable range 410 of the document 400 at the same as a layout enabling area of the document where a user can create the layout as he will. It is further desirable to set the layout enabling area of the document where the operator creates the layout on a section paper and to set the squares of the section paper at the same as the touch-detecting measures of the display panel 5 shown in FIG. 5B. With these arrangements, the dimensions of the operation keys and the layout reproduced on the actual display panel can maximally approximate to those written on the document by the operator.

In the case of being unable to set the dimensions of the layout enabling area 410 on the document at the same as those of the display area of the display panel 5, it is desirable to adjust a ratio of horizontal to vertical dimensions (X1/Y1) of the layout enabling area 410 of the document to a ratio of horizontal to vertical dimensions (Xp/Yp) of the display area of the display panel 5. By doing so, the layout displayed on the display panel can approximate to the layout of the operation keys desired by the operator, with the result that no large sense of incongruity will be given to the operator.

In the respective foregoing embodiments, the new operation unit data after the conversion may be saved in the storage means 22 and this operation unit data may be printed on a copy sheet (recording means) in such a format analyzable by other terminal devices or may be stored in a flexible magnetic disk, a CD-ROM or like storage means.

The image forming apparatus 1 according to each of the foregoing embodiments may be constructed such that the operation unit data thus generated is read from the storage means and the construction of the operation unit 6 is changed based on this operation unit data.

In the respective foregoing embodiments, the new operation unit data after the conversion may be transmitted to an external terminal device via the data communication means 7.

For example, the new operation unit data after the conversion may be transmitted to an external mobile phone via the data communication means 7, the operation unit of the image forming apparatus 1 may be formed in the mobile phone, and the image forming apparatus 1 may be operated by the mobile phone.

In summary, the image reader according to the first embodiment of the present invention comprises:

(a) the image reading means for reading the image information of the document, (b) the operation unit provided with the display panel adapted to display the operation keys and the information and touch-operable by the user, (c) the control unit for controlling the operations of the image reading means and the operation unit, and (d) the display changing signal input means for inputting a signal to change the display of the display panel, wherein the control unit is provided with:

the function of, when a display changing signal is inputted from the display changing signal input means and the image data of the operation keys described by the closed areas in the layout written on the document is read by the image reading means, analyzing the image data and determining the display operation keys to be displayed on the display panel in correspondence with the operation keys, the function of displaying the display operation keys on the display panel, the function of displaying the function selection screen used to allot the functions to the display operation keys after the display operation keys are displayed on the display panel, and the function of allotting the functions selected from the function list on the function selection screen to the display operation keys.

Further, the image reader according to the second embodiment of the present invention comprises:

(a) the image reading means for reading the image information of the document and the information, (b) the operation unit provided with the display panel adapted to display the operation keys and information, and touch-operable by the user, (c) the control unit for controlling the operations of the image reading means and the operation unit, and (d) the display changing signal input means for inputting a signal to change the display of the display panel, wherein the control unit is provided with:

the function of, when a display changing signal is inputted from the display changing signal input means and the image data of the operation keys described by the closed areas in the layout written on the document and the function data corresponding to the operation keys are read by the image reading means, analyzing the image data, determining the display operation keys to be displayed on the display panel in correspondence with the operation keys, and allotting the corresponding functions to the display operation keys, and the function of displaying the display operation keys on the display panel.

In the first and second embodiments, the control unit may be provided with the function of displaying the functions corresponding to the display operation keys on the display panel.

Further, the function data are desirably numbers or symbols written in relation to the image data.

In the first embodiment, among the display operation keys displayed on the display panel, those having the function selected therefor and those having no function selected therefor may be distinguishably displayed.

Further, the control unit may be so set as to be unable to allot the already allotted function in the function list on the function selection screen to other display operation keys.

In the first embodiment, the control unit may display the unallotted function in correspondence with the display operation key having no function selected therefor if there is any display operation key having no function allotted therefor yet.

In the first and second embodiments, the control unit may be further provided with the function of storing the data corresponding to the changed layout displayed on the display panel in the storage means and the function of switching the display of the display panel based on the data stored in the storage means.

In the first and second embodiments, the control unit may transmit the data corresponding to the changed layout displayed on the display panel to an external terminal device via the communication means. Here, the external terminal device may be a mobile phone, a PHS, an image reader such as a network scanner, an image forming apparatus such as a copier or a facsimile or the like.

Still another embodiment of the present invention concerns the image forming apparatus comprising the image reader according to the first or second embodiment and the printing unit for printing an image on the recording material based on the image data read by the image reader.

Further another embodiment of the present invention concerns the storage medium storing the control program of the image reader comprising the image reading means for reading the image information of the document, the operation unit provided with the display panel adapted to display the operation keys and various pieces of information and touch-operable by the user, the control unit for controlling the operations of the image reading means and the operation unit, and the display changing signal input means for inputting a signal to switch the display of the display panel, wherein the control program causes the control unit to execute:

(i) the function of, when a display changing signal is inputted from the display changing signal input means and the image data of the operation keys described by the closed areas in the layout written on the document is read by the image reading means, analyzing the image data and determining the display operation keys to be displayed on the display panel in correspondence with the operation keys, (ii) the function of displaying the display operation keys on the display panel, (iii) the function of displaying the function selection screen used to allot the functions to the display operation keys after the display operation keys are displayed on the display panel, and (iv) the function of allotting the functions selected from the function list on the function selection screen to the display operation keys.

Still further another embodiment of the present invention concerns the storage medium storing the control program of the image reader comprising the image reading means for reading the image information of the document, the operation unit provided with the display panel adapted to display operation keys and various pieces of information and touch-operable by the user, the control unit for controlling the operations of the image reading means and the operation unit, and the display changing signal input means for inputting a signal to switch the display of the display panel, wherein the control program causes the control unit to execute:

(i) the function of, when a display changing signal is inputted from the display changing signal input means and the image data of the operation keys described by the closed areas in the layout written on the document and the function data corresponding to the operation keys are read by the image reading means, analyzing the image data, determining the display operation keys to be displayed on the display panel in correspondence with the operation keys, and allotting the corresponding functions to the display operation keys, and (ii) the function of displaying the display operation keys on the display panel.

This application is based on Japanese patent application serial No. 2002-125900, filed in Japan Patent Office on Apr. 26, 2002, the contents of which are hereby incorporated by reference.

Although the present invention has been fully described by way of examples with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reader which reads image information and produces image data representing the image information, comprising:
    (a) an image reading means for reading an image information of documents and producing the image data representing the image in formation for use in image production, the documents including a document having a layout of desired operation keys written by a user,
    (b) an operation unit provided with a display panel adapted to display operation keys and touch-operable by the user,
    (c) a control unit controlling operations of the image reading means and the operation unit based on operation of the operation keys displayed, and
    (d) a display changing signal input means for inputting a signal to change the display of operation keys of the display panel,
    wherein the control unit is configured to effect the following functions:
    a function of, when a display changing signal is inputted from the display changing signal input means and an image data of the desired operation keys described by closed areas in a layout written on the document is read by the image reading means, analyzing the image data and, based on analyzing the image data, determining display operation keys to be displayed in a changed layout on the display panel in correspondence with the desired operation keys,
    a function of displaying the display operation keys on the display panel,
    a function of displaying a function selection screen used to allot functions to the display operation keys after the display operation keys are displayed on the display panel, and
    a function of allotting the functions selected from a function list on the function selection screen to the display operation keys.

2. An image reader according to claim 1, wherein the control unit is further provided with a function of displaying the allotted functions on the display panel in correspondence with the display operation keys.

3. An image reader according to claim 1, wherein, among the display operation keys displayed on the display panel, those having the functions already selected therefor and those having no function selected therefor are distinguishably displayed.

4. An image reader according to claim 1, wherein the control unit is so set as to be unable to allot the already allotted function in the function list on the function selection screen to an other display operation key.

5. An image reader according to claim 1, wherein, if there is any display operation key having no function allotted therefor yet, the control unit displays the unallotted function in correspondence with such a display operation key.

6. An image reader according to claim 1, wherein the control unit is further provided with a function of storing a data corresponding to the changed layout displayed on the display panel in a storage means and a function of switching the display of the display panel based on the data stored in the storage means.

7. An image reader according to claim 1, wherein the control unit transmits a data corresponding to the changed layout displayed on the display panel to an external terminal device via a communication means.

8. An image reader which reads image information and produces image data representing the image information, comprising:
    (a) an image reading means for reading an image information of documents and producing the image data representing the image information for use in image production, the documents including a document having a layout of desired operation keys written by a user,
    (b) an operation unit provided with a display panel adapted to display operation keys and touch-operable by the user,
    (c) a control unit controlling operations of the image reading means and the operation unit based on operation of the operation keys displayed, and
    (d) a display changing signal input means for inputting a signal to change the display of operation keys of the display panel,
    wherein the control unit is configured to effect the following functions:
    a function of, when a display changing signal is inputted from the display changing signal input means and an image data of the desired operation keys described by closed areas in a layout written on the document and function data corresponding to the operation keys are read by the image reading means, analyzing the image data and, based on analyzing the image data, determining display operation keys to be displayed in a changed layout on the display panel in correspondence with the desired operation keys, and allotting corresponding functions to the display operation keys, and
    a function of displaying the display operation keys on the display panel.

9. An image reader according to claim 8, wherein the control unit is further provided with a function of displaying the allotted functions on the display panel in correspondence with the display operation keys.

10. An image reader according to claim 8, wherein the function data are numbers or symbols written in relation to the image data of the operation keys.

11. An image reader according to claim 8, wherein the control unit is further provided with a function of storing a data corresponding to the changed layout displayed on the display panel in a storage means and a function of switching the display of the display panel based on the data stored in the storage means.

12. An image reader according to claim 8, wherein the control unit transmits a data corresponding to the changed layout displayed on the display panel to an external terminal device via a communication means.

13. An image reader which reads image information and produces image data representing the image information, comprising:

(a) an image reader including:
- (a1) an image reading means for reading an image information of documents and producing the image data representing the image information for use in image production, the documents including a document having a layout of desired operation keys,
- (a2) an operation unit provided with a display panel adapted to display operation keys and information and touch-operable by a user,
- (a3) a control unit controlling operations of the image reading means and the operation unit based on operation of the operation keys displayed, and
- (a4) a display changing signal input means for inputting a signal to change the display of operation keys of the display panel, wherein the control unit is configured to effect the following functions:

a function of, when a display changing signal is inputted from the display changing signal input means and an image data of the desired operation keys described by closed areas in a layout written on the document is read by the image reading means, analyzing the image data and, based on analyzing the image data, determining display operation keys to be displayed in a changed layout on the display panel in correspondence with the desired operation keys, a function of displaying the display operation keys on the display panel, a function of displaying a function selection screen used to allot functions to the display operation keys after the display operation keys are displayed on the display panel, and a function of allotting the functions selected from a function list on the function selection screen to the display operation keys, and (b) a printing unit for printing an image of the document on a recording sheet based on the image data read by the image reader and operation of the display operation keys.

14. An image reader which reads image information and produces image data representing the image information, comprising:
(a) an image reader including:
- (a1) an image reading means for reading an image information of documents and producing the image data representing the image information for use in image production, the documents including a document having a layout of desired operation keys,
- (a2) an operation unit provided with a display panel adapted to display operation keys and information and touch-operable by a user,
- (a3) a control unit controlling operations of the image reading means and the operation unit based on operation of the operation keys displayed, and
- (a4) a display changing signal input means for inputting a signal to change the display of operation keys of the display panel, wherein the control unit is configured to effect the following functions:

a function of, when a display changing signal is inputted from the display changing signal input means and an image data of the desired operation keys described by closed areas in a layout written on the document and function data corresponding to the operation keys are read by the image reading means, analyzing the image data and, based on analyzing the image data, determining display operation keys to be displayed in a changed layout on the display panel in correspondence with the desired operation keys, and allotting corresponding functions to the display operation keys, and a function of displaying the display operation keys on the display panel, and (b) a printing unit for printing an image of the document on a recording sheet based on the image data read by the image reader and operation of the display operation keys.

15. A computer readable storage medium storing an executable control program of an image reader comprising:

an image reading means for reading an image information of documents and producing the image data representing the image information for use in image production, the documents including a document having a layout of desired operation keys written by a user, an operation unit provided with a display panel adapted to display operation keys and information and touch-operable by a user, a control unit controlling operations of the image reading means and the operation unit based on operation of the operation keys displayed, and a display changing signal input means for inputting a signal to change the display of operation keys of the display panel, wherein the control program configures the control unit to execute:
- (i) a function of, when a display changing signal is inputted from the display changing signal input means and an image data of the desired operation keys described by closed areas in a layout written on the document is read by the image reading means, analyzing the image data and, based on analyzing the image data, determining display operation keys to be displayed in a changed layout on the display panel in correspondence with the desired operation keys,
- (ii) a function of displaying the display operation keys on the display panel,
- (iii) a function of displaying a function selection screen used to allot functions to the display operation keys after the display operation keys are displayed on the display panel, and
- (iv) a function of allotting the functions selected from a function list on the function selection screen to the display operation keys.

16. A computer readable storage medium storing an executable control program of an image reader comprising:

an image reading means the reading an image information of documents and producing the image data representing the image information for use in image production, the documents including a document having a layout of desired operation keys written by a user, an operation unit provided with a display panel adapted to display operation keys and information and touch-operable by a user, a control unit controlling operations of the image reading means and the operation unit based on operation of the operation keys displayed, and a display changing signal input means for inputting a signal to change the display of operation keys of the display panel, wherein the control program configures the control unit to execute:
- (i) a function of, when a display changing signal is inputted from the display changing signal input means and an image data of the desired operation keys described by closed areas in a layout written on the document and function data corresponding to the operation keys are read by the image reading means, analyzing the image data and, based on analyzing the image data, determining display operation keys to be displayed in a changed layout on the display panel in correspondence with the desired operation keys, and allotting corresponding functions to the display operation keys, and (ii) a function of displaying the display operation keys on the display panel.

17. An image reader which roads image information and produces image data representing the image information, comprising:

(a) an image reading means for reading an image information of documents and producing the image data representing the image information for use in image production, the documents including a document having a layout of desired operation keys written by a user, (b) an operation unit provided with a display panel adapted to display operation keys and touch-operable by the user, (c) a control unit controlling operations of the image reading means and the operation unit based on operation of the operation keys displayed, and (d) a display changing signal input means for inputting a signal to change the display of operation keys of the display panel, wherein the control unit comprises:

means for, when a display changing signal is inputted from the display changing signal input means and an image data of the desired operation keys described by closed areas in a layout written on the document is read by the image reading means, analyzing the image data and, based on analyzing the image data, determining display operation keys to be displayed in a changed layout on the display panel in correspondence with the desired operation keys, means for displaying the display operation keys on the display panel, means for displaying a function selection screen used to allot functions to the display operation keys after the display operation keys are displayed on the display panel, and means for allotting the functions selected from a function list on the function selection screen to the display operation keys.

18. A method for creating a customized operation panel for an image reader wherein the image reader comprises:

an image reading means for reading an image information of documents and producing the image data representing the image information for use in image production, the documents including a document having a layout of desired operation keys defining the customized operation panel, an operation unit provided with a display panel adapted to display operation keys and information and touch-operable by a user, a control unit controlling operations of the image reading means and the operation unit based on operation of the operation keys displayed, and a display changing signal input means the inputting a signal to change the display of operation keys of the display panel, the method comprising the steps of:

inputting from the display changing signal input means and an image data of the operation keys described by closed areas in the layout written on the document is read by the image reading means;

analyzing the image data to see if there is a closed area on the image data having been read by the image reading means and recognizing the closed area as a display operation key;

displaying the display operation key that was recognized in the above step on the display panel;

displaying a function selection screen that can be used to allot function to the display operation key after the display operation key is displayed on the display panel in the above step;

selecting a function to allot from the function selection screen; and allotting the function selected from a function list on the function selection screen to the display operation key.

* * * * *